United States Patent [19]

Spinelli et al.

[11] Patent Number: 4,880,371
[45] Date of Patent: Nov. 14, 1989

[54] APPARATUS OF MACHINING DOUGHY MATERIAL

[75] Inventors: Louis A. Spinelli, Patterson; Jeffrey M. Jenniges, Pompton Lakes, both of N.J.

[73] Assignee: Nabisco Brands, Inc., Parsippany, N.J.

[21] Appl. No.: 321,987

[22] Filed: Mar. 10, 1989

Related U.S. Application Data

[60] Division of Ser. No. 948,380, Dec. 31, 1986, which is a continuation-in-part of Ser. No. 839,448, Mar. 10, 1986, abandoned, which is a continuation of Ser. No. 670,833, Nov. 13, 1984, abandoned.

[51] Int. Cl.$^4$ .......................... B29C 47/92; A21C 3/02
[52] U.S. Cl. ........................................ 425/135; 100/47; 264/40.7; 425/141; 425/145; 425/308; 425/335
[58] Field of Search ................ 425/135, 141, 145, 308, 425/310, 312, 335, 337, 363; 426/231, 496, 502, 517; 264/40.7; 100/47

[56] References Cited

U.S. PATENT DOCUMENTS

| | | | |
|---|---|---|---|
| 1,883,592 | 10/1932 | Crosland | 426/502 |
| 2,357,085 | 8/1944 | Cohen et al. | 107/54 |
| 2,576,670 | 11/1951 | Cohen | 107/54 |
| 2,735,379 | 2/1956 | Stiles | 197/12 |
| 2,965,050 | 12/1960 | Doering | 425/308 |
| 3,476,058 | 11/1979 | Watkin et al. | 425/141 |
| 3,593,676 | 7/1981 | Reid | 107/12 |
| 3,901,635 | 8/1975 | Greenberger | 425/145 |
| 4,192,636 | 3/1980 | Hayashi et al. | 425/96 |
| 4,233,255 | 11/1980 | Moon | 264/40.4 |
| 4,266,920 | 5/1981 | Hayashi et al. | 425/133.1 |
| 4,276,317 | 6/1981 | Hayashi | 426/501 |
| 4,368,165 | 1/1983 | Bergendahl | 100/47 |
| 4,398,877 | 8/1983 | Taylor | 425/145 |
| 4,421,776 | 12/1983 | Brinkers | 426/502 |
| 4,424,236 | 1/1984 | Campbell | 426/231 |

FOREIGN PATENT DOCUMENTS 1166454  10/1969  United Kingdom .
2078403  1/1982  United Kingdom .

Primary Examiner—George Yeung
Attorney, Agent, or Firm—Richard Kornutik

[57] ABSTRACT

A method and apparatus for machining dough that takes into account the different flow regimes exhibited by the dough during processing. As in conventional systems, the apparatus includes a hopper for extruding dough in a sheet and pairs of powered rollers for sizing the sheet. A computer controls the system. Mass flow rate is made constant throughout the system by establishing a master flow rate based upon predetermined criteria related to the product being produced, and the computer monitors the weight of the extruded sheet to maintain a constant input to the powered rollers. The flow rate is varied to remain constant by comparing the input to output, as measured by the sheet thickness at the cutter station. The gage rollers are controlled by setting a nominal roller speed, trimmed according to the tension present in the sheet upstream of the gage roll, as reflected in the position of a loop in the dough sheet between the gage roll and the pair of rolls immediately upstream of same.

5 Claims, 8 Drawing Sheets 4,880,371

APPARATUS OF MACHINING DOUGHY MATERIAL

RELATED APPLICATIONS

This application is a division of application Ser. No. 948,380, filed Dec. 31, 1986, which is in turn a continuation-in-part of application Ser. No. 839,448, filed Mar. 10, 1986, now abandoned, which was a continuation of application Ser. No. 670,833, filed Nov. 13, 1984, now abandoned.

BACKGROUND OF THE INVENTION

The present invention relates to the field of dough processing, and more particularly to the field of machining a continuous dough sheet to provide a quantity of biscuits or crackers to a baking oven.

A primary objective of any dough machining process is to control the weight of the pieces being output to the baking oven that generally forms the succeeding step in an overall process.

The fundamental difficulty in controlling such processes lies in the interdependence of successive process steps. When, as is typical, a dough machining process includes a number of size reduction, lamination, and cutting steps, an adjustment in a processing variable at any point in the process will cause changes elsewhere in the system, necessitating further adjustment. The prior art depends primarily upon experienced operators to control such processes by "feel", resulting in considerable variation in piece weight at the process output. Automated process control in the prior art has been somewhat lacking, due to the interdepedence of process steps, but some efforts have been made to control individual portions of the process, as discussed below.

To date, however, the art has not succeeded in perfecting an integrated control system that can address a dough machining process as a whole. That need is filled by the present invention.

SUMMARY OF THE INVENTION

It is an object of this invention to provide a process for machining dough in which the output can be maintained constant with a desired degree of accuracy.

Another object of the invention is a dough machining process that automatically integrates the control of all steps of the process.

A further object of the invention is a dough machining process that incorporates a control system that takes into consideration the differing flow regimes of dough under different roller configurations.

These and other objects are achieved in the present invention, a process for machining dough in a pair of opposed powered rollers, in which dough is fed as an input dough sheet to the rollers at a constant mass flow rate. The roller speed is calculated by a system controller, communicating with sensors to detect the tensile forces present in the input dough sheet and control circuits to vary the roller speed in response to the tensile forces. The input dough sheet is passed between the rollers to produce an output dough sheet. Acting through sensors, the system controller monitors regarding the roller speed, the tensile forces, and the output dough sheet thickness, and based upon the information so provided, it calculates a new roller speed based upon the provided information. It is preferred that the system controller be a digital computer appropriately programmed, and that the system sensors be capable of accurately sensing speeds of the various roller apparatus and the position of the dough sheet at selected locations.

DETAILED DESCRIPTION OF A PREFERRED EMBODIMENT

Before proceeding to a detailed consideration of the invention, it is important to understand the basic discoveries concerning dough processing that underlie the present invention. As will be seen, the inability of prior art devices to control the dough machining process results from the art's faiure to understand the mechanics of that process.

The prior art has not considered that different roller configurations result in markedly differing dough flow regimes, producing different performance characteristics. It has been found that under varying conditions, dough can undergo drag flow, plug flow, or pressure flow.

Figure 1A:
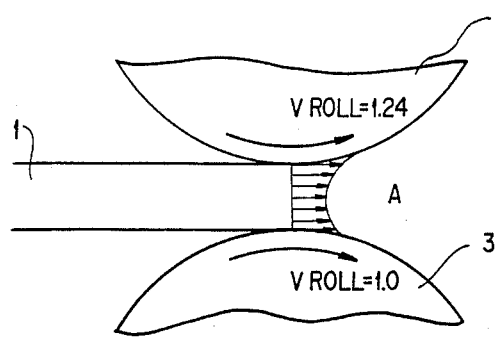
FIGS. 1 (a)-(f) are schematic representations of a dough machining process, with flow velocity diagrams depicting various; modes of dough flow.
Figure 1B:
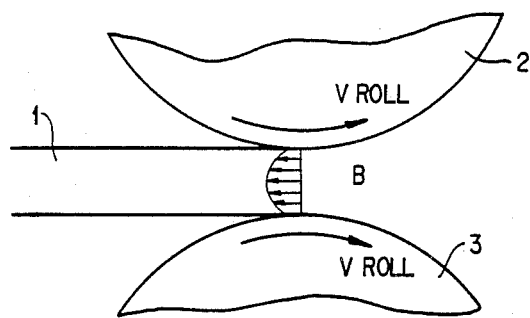

FIGS. 1(a)-(f) schematically represent a dough sheet 1 passing between two rollers 2 and 3. As is typical in dough processing, the upper roller 2 is powered at a slightly higher rotational velocity than is the lower roller 3, generally in a ratio of about 1.24/1.00. In the configuration shown in FIG. 1(a), the dough sheet has approximately the same thickness as the roller gap, so that minimal reduction of the sheet is being performed. In this instance, transfer of the sheet occurs by drag between the roller surfaces and the dough, and the sheet exhibits a velocity profile as shown by the arrows A, with the outer surfaces travelling at the roller velocity and the center portion at a lower rate. The relationship between roller velocity and dough velocity, which hereafter will be termed "relative velocity", is shown in FIG. 1(b), and in keeping with the discussion above, the profile of that velocity is negative. It will be noted that momentum transfer in this regime is governed by dough viscosity.

Figure 1C:
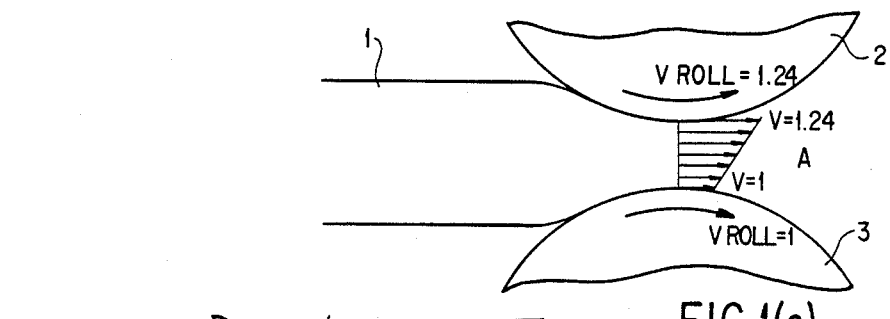
Figure 1D:
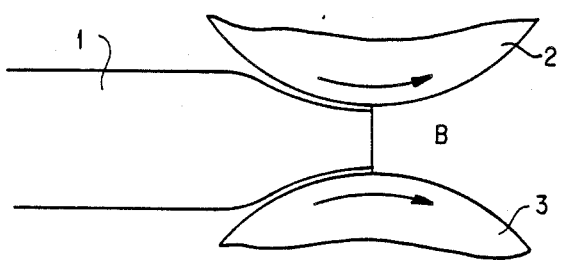

When a moderate level of reduction is being performed by the rollers, the dough exhibits flow characteristics as shown in FIGS. 1(c) and 1(d). Here, the velocity at each surface of the sheet matches that of the respective roller, but the dough is being sufficiently compressed that the actual flow velocity profile (FIG. 1(c)) is a straight line, and the relative velocity (FIG. 1(d)) is flat. Thus, the dough exhibits plug flow—that is, the dough does not yield under the stress imposed by the rollers.

Figure 1E:
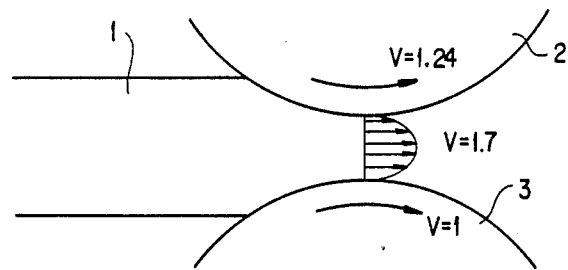
Figure 1F:
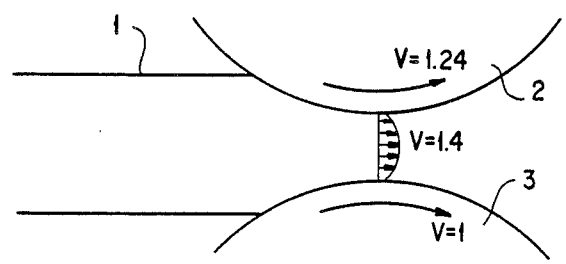

During a processing step in which significant sheet reduction occurs, however, the dough does yield, and pressure flow takes place, as seen in the relative flow diagram of FIG. 1(e). Under pressure flow, the dough velocity exhibits behavior exactly opposite to that seen for drag flow. Here, the stress imposed by the rollers exceeds the yield strength of the dough, causing the central portion of the dough to travel at a higher velocity than at either surface. It has been observed that dough being processed by rollers whose velocity ratio is 1.24/1.00 can emerge from the roller nip at an average relative velocity of 1.7. Clearly, the dough viscosity plays an important role in determining the exit velocity of the dough. That point can be seen by comparing FIGS. 1(e) and 1(f), in which the only variable factor is the dough viscosity. The former figure shows the results achieved with a relatively lower viscosity dough, and as stated, the average relative velocity of the dough is 1.7. In contrast, FIG. 1(f) depicts a relatively higher viscosity dough, which does not yield as readily as the dough of the previous figure, and therefore has a lower relative velocity, about 1.4, as it leaves the roller nip.

These discoveries have profound implications for the design of dough process control systems. For example, the only difference between the results seen in FIGS. 1(e) and 1(f) is the dough consistency. Control systems used in the art have no means for coping with variations of this sort, yet such variations occur constantly in the course of dough production. It can be seen from the figures that the rollers of FIG. 1(e) are producing a dough sheet having a mass flow rate different from that of FIG. 1(f), and therefore the products of the two systems will likewise differ.

Furthermore, the principles set out above explain the failure of the prior art to control dough processing at desired levels of consistency. For example, it has been proposed in U.S. Pat. No. 4,398,877 to employ the power demand of a pair of rollers as a control indicator in a dough machining process. According to the teaching of that patent, power (directly, in terms of power demand on the motor driving the roller, or indirectly, in terms of torque) is monitored, and roller speed is adjusted accordingly to produce a dough sheet of consistent mass. That teaching, of course, assumes that a linear relationship exists between power and mass flow rate, such that, for example, a lowering of power demand would reliably indicate a diminished quantity of dough being processed, such that a control circuit could increase roller speed by a selected amount to compensate for the shortfall.

Figure 2:
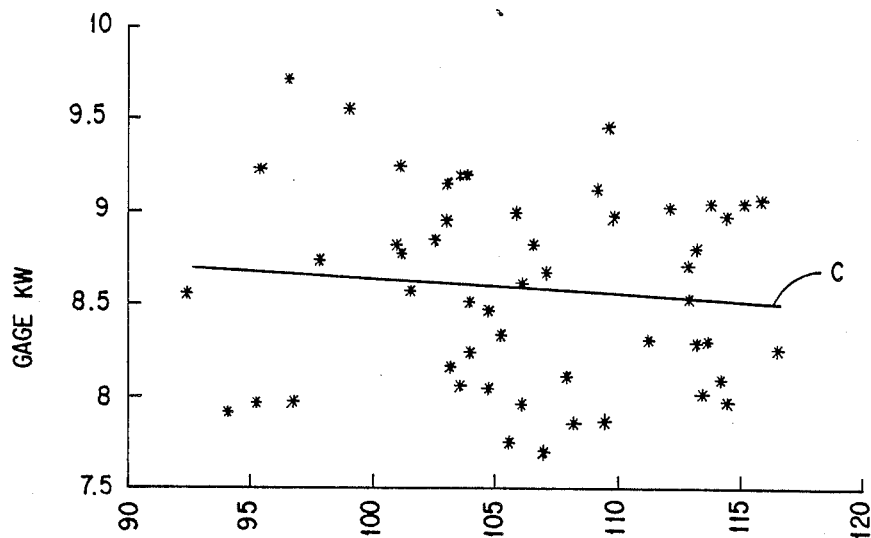
FIG. 2 is a chart showing the results of a test of a control system based upon power demand of a pair of opposed rollers.

Unfortunately, however, that linear relationship does not exist, because the power demand of the roller depends not only upon the quantity of dough but also upon the dough's viscosity, particularly in a pressure flow regime. That fact is reflected in the results charted in FIG. 2, which reports a test of a dough process control system based upon power demand. Asterisks plot individual test measurements, with piece weight in grams, covering a range useful for producing, for example, crackers on the x axis and power in kilowatts on the y axis. As can be seen, the trend line C can be plotted, but individual runs will vary from the predicted value by 5–10%. That degree of variation does not provide effective process control.

Figure 3:
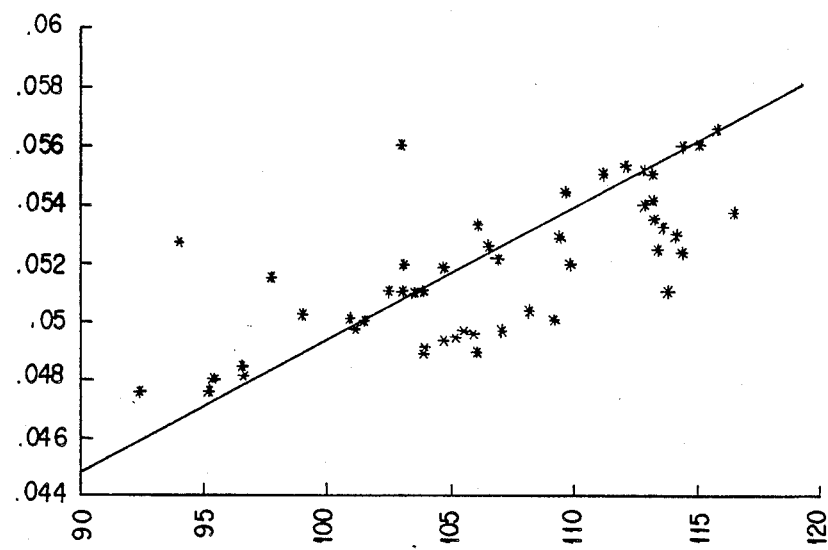
FIG. 3 is a chart showing the observed correllation between piece thickness and piece weight.

Another significant discovery underlying the present invention is that the thickness of the dough sheet immediately upstream of the cutter correllates very closely with piece weight. FIG. 3 is a representation of sheet thickness, measured on-line with a laser position sensor, versus piece weight. It can be seen that the data group closely about the trend line providing data accurate to within 4%, a considerable improvement over the predictability obtainable with the power-demand system. Employing thickness as a control variable points the way toward a workable and effective system.

Figure 4:
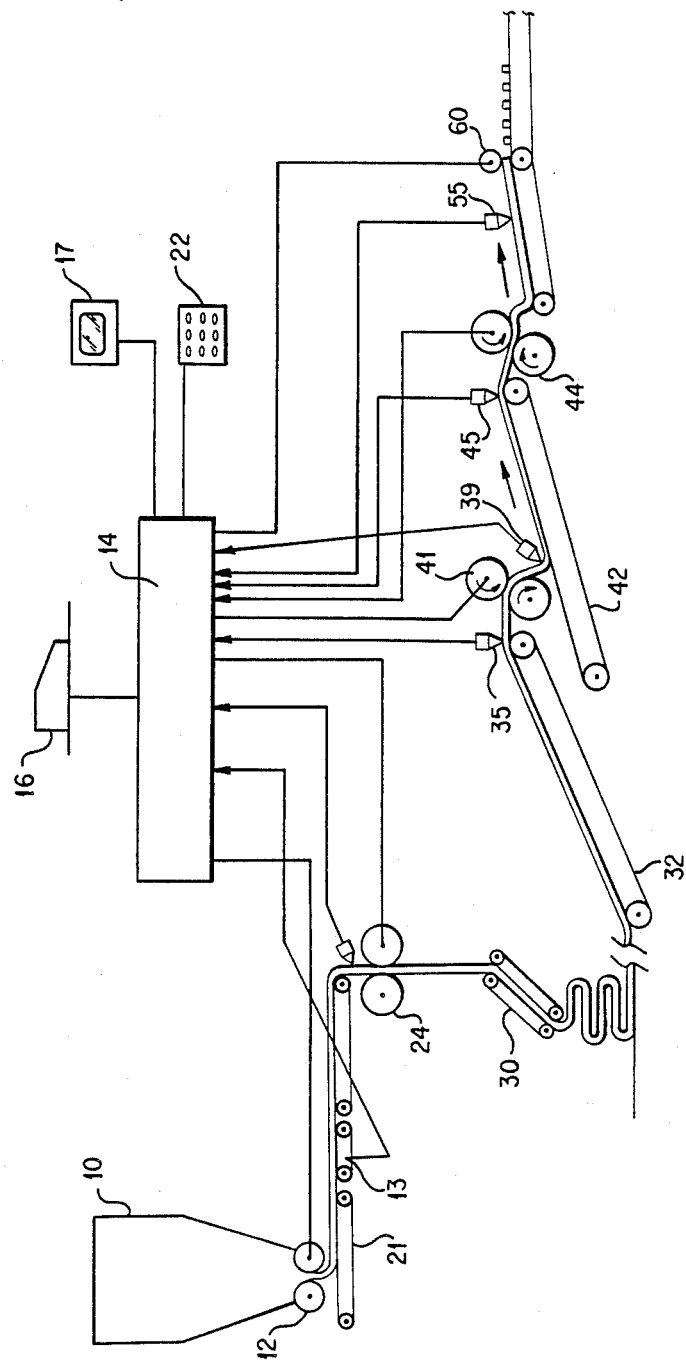
FIG. 4 is a schematic diagram showing overall mass flow control according to the present invention.

Bearing in mind the principles set forth above, one can better understand and appreciate the integrated control system illustrated in FIG. 4. The apparatus shown is typical for a dough machining process, but it should be noted that the present invention may be applied to a variety of processes, some of which may employ different equipment or arrange the apparatus in a different manner. The present invention addresses such processes and can readily be implemented therein.

In the dough process shown in FIG. 4, dough is extruded in a sheet from a hopper 10 onto a cross-conveyor 21 by feed rollers 12. Initial sizing of the dough sheet is performed by jumbo rollers 24, after which the sheet is fed into a laminator apparatus 30. For ease of feeding, the dough sheet generally is dropped vertically into the laminator, the arms of which pivot about their upstream ends to layer the sheet, as is known in the art. As many successive preliminary sizing and lamination steps as are desired for the end product may be included at this point in the process. Following such lamination, the sheet travels up an inclined conveyor 32 to auxilliary rolls 41, where additional sizing and some thickness reduction occurs. The sheet then moves over a second inclined conveyor to gage rolls 44, where the sheet is reduced to its final thickness, and on to cutter 60, which cuts the sheet into the final product, ready for baking.

Heretofore, industry practice has been to control individual portions of the process by semi-automatic means, but the process as a whole has not been seen as amenable to automatic control. Changes in machine speed under manual or semi-automatic control systems were made piecemeal, generally by an operator relying upon "feel" and experience. A change at one point causes further changes to be necessary at other points, however, and an operator usually found himself one step behind the machines, always having to react to conditions caused by the latest change in some other part of the process.

In the present invention, the process control system is integrated, with each step monitored and regulated by a central controller, computer 14. The computer is herein referred to generically, inasmuch as those in the art understand that a general system such as the present invention may be implemented upon a wide variety of hardware systems. The computer includes means for manual data entry 22, such as a keyboard, and output means such as a video screen 17 and printer 16.

A significant advantage of the present invention is the implementation of "feed forward" control of all portions of the system. The most advanced systems proposed by the prior art include so-called "signal cascade" control, in which a control loop in one portion of the system is related to another loop, by providing fixed speed ratios between the various rollers. It has been found, however, that these ratios should not be constant, but rather should be set dynamically, based upon the roller gaps and flow rate (which in turn varies based upon dough consistency). The prior art systems result in a control technique in which the system continually seeks the correct roller speeds, but usually is incorrect at some points in the process. In contrast, the method of the present invention calculates roller speed ratios to maintain a flow rate and then trims individual roller speeds in response to sensed variations in dough consistency. It should be noted that a continuing requirement for trim, indicating a persisting rather than transient mismatch between calculated and required speed, results in a recalculation of ratios to maintain the correct flow rate. Thus, changes are implemented rapidly and smoothly, affecting the entire process at once. Only in this manner can the entire system be placed in balance and maintained in that condition.

Use of the computer allows control to proceed simultaneously (from the user perspective) on several levels. The system can thus best be conceived as a single entity combining the performance of several interrelated tasks, including overall mass flow control, hopper control, and auxilliary/gage roll control.

Figure 5:
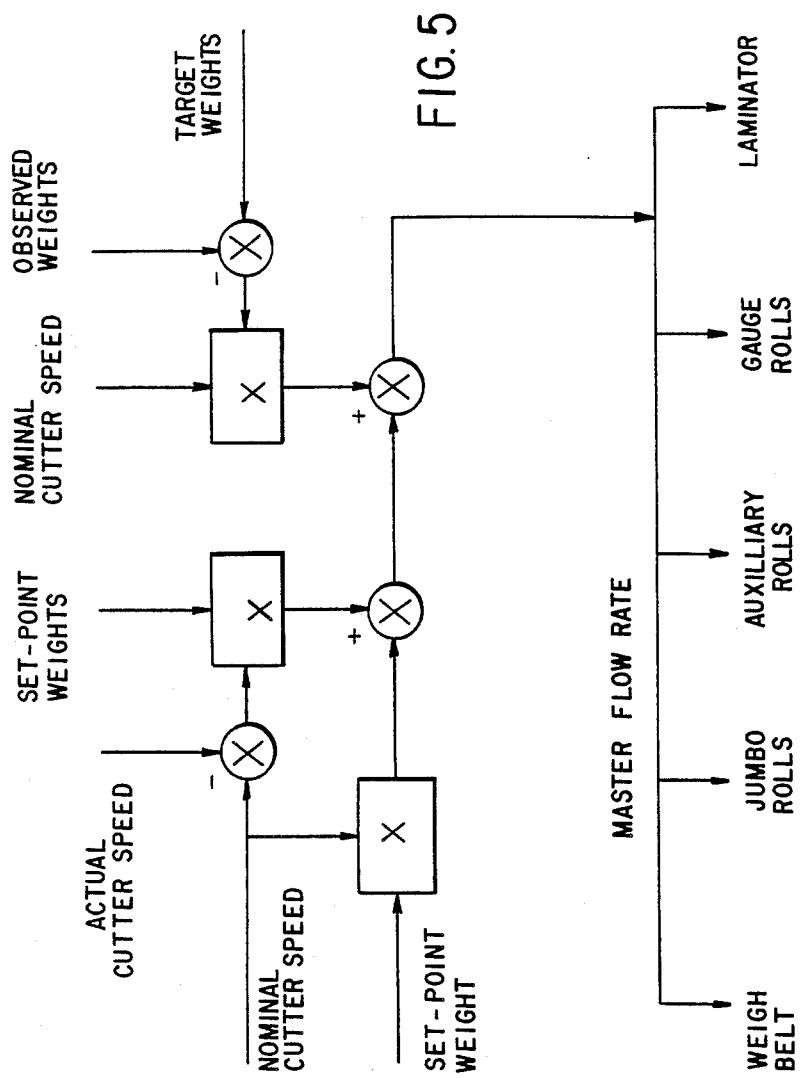
FIG. 5 is a control diagram showing overall mass control according to the present invention.

Overall flow control can be visualized by following the flow diagram of FIG. 5. As implied, the overall flow control subsystem establishes a target mass flow rate and monitors actual output to determine whether that flow rate is maintained. Inputs shown in this diagram are either provided by the user or gathered by the system itself. User-supplied data include nominal cutter speed, set-point weight, and target weight. Such parameters can be input by the machine operator manually, or more preferably, by a computer program. The system monitors actual cutter speed by a sensor located in the cutter 60 (FIG. 4).

Observed weights are obtained in one of two manners. First, the relationship between sheet thickness and piece weight can be employed to obtain a continuous reading, taking a signal from thickness sensor 55 and processing it to obtain a weight per piece. At set intervals, actual piece weight can be obtained by weighing final product according to a sampling plan as known to the art, and the data can be either manually output or the scale can communicate the information to the computer. Using these data, the computer calculates a master flow rate—the mass flow rate at which the system should be operating. That rate is translated by the computer into nominal rotational speeds for each of the rollers, and that information is fed to the motor controllers linked to the respective rolls. As will be described below, each roll speed is further trimmed in response to transient dough flow characteristics.

Figure 6:
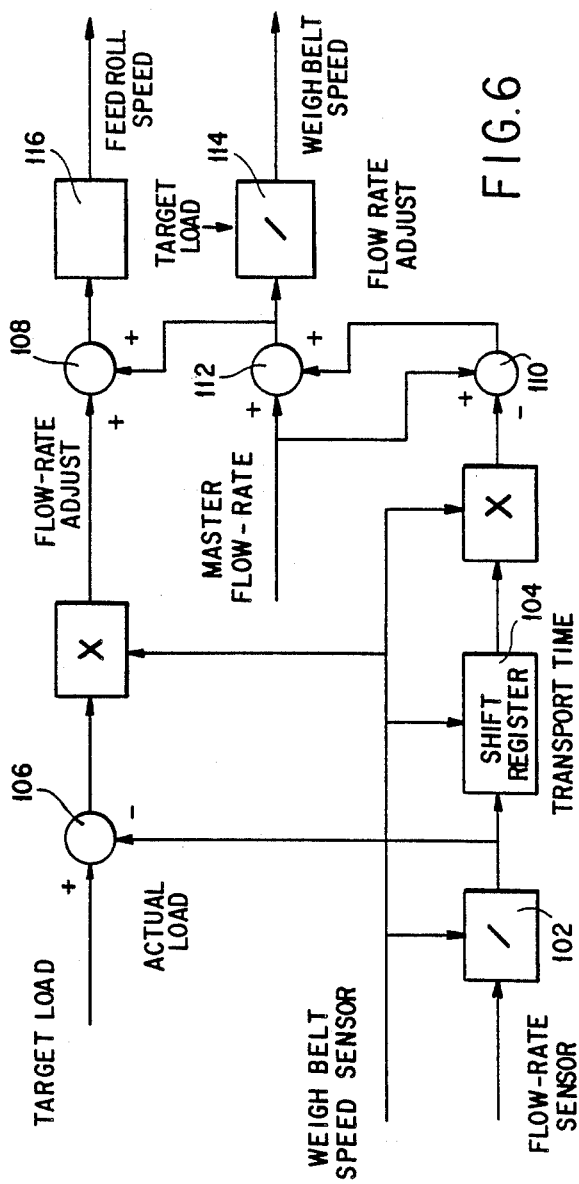
FIG. 6 is a control diagram showing mass flow input control according to the present invention.

A second subsystem insures that the mass flow rate of dough being fed to the process is constant. It has been found that operating the hopper feed rolls at a constant speed does not suffice to provide constant mass flow to the machining line. Variables such as the amount of back-pressure on the feed rolls and others combine to produce pronounced variations in dough flow, even given conventional control of the feed rolls. Therefore, the system of the present invention seeks to insure constant mass flow by monitoring the actual amount of dough being extruded from the hopper. As seen in the flow diagram of FIG. 6, the system receives two inputs from weight belt 13 (FIG. 4)—the belt speed and the flow rate (derived from the direct weight signal generated by the weigh belt, indicated by block 102). A shift register 104 allows for a time compensation for belt dead time, by loading data into the register, shifting the register one position each sampling period, and then outputting the data when sufficient time has passed equivalent to the time required for dough to travel the length of the belt.

Two adjustments are made based upon these calculations. First, any discrepancy between the master flow rate and actual flow rate, calculated as shown in block 112, results in a change in weigh belt and cross-conveyor speed, to maintain a constant mass flow rate to the jumbo rolls (block 114). Similarly, the difference between target load and actual load, indicated by block 106, is combined with the flow-rate adjustment signal (block 108) to change the feed roll speed (block 116). With constant monitoring and feedback control, the flow rate remains under close control at the input end of the process. When these measures are combined with the data fed back via the master flow rate, it becomes possible to maintain an equal flow rate throughout the process, with mass flow input equal to mass flow output at all times.

The dough input subsystem generally insures that the flow rate to the jumbo rolls 24 (FIG. 4) is constant. To allow for any variations caused by changes in dough consistency, however, there may be provided a position sensor 27 located immediately upstream from the jumbo rolls senses any change in the dough sheet position, and that information allows the jumbo rolls speed to be trimmed to compensate for such changes. This sensor, as with other position sensors discussed hereafter, may be selected from the variety of such devices available to the art, preferably an reflectance-type sensor employing a fiber optic light gathering unit.

It has been found that about 90% of the machining energy imparted to the dough is transferred by gage rolls 44, and thus a great deal of attention is paid to control of these rolls and the auxilliary rolls 41 that feed them. Harking back to the discussion of flow characteristics above, flow at the auxilliary rolls is plug or drag flow, while the gage rolls exhibit pressure flow. Therefore, dough consistency will primarily affect the gage rolls, and a means must be devised to maintain an even flow through them.

Apart from the control exercised by the "feed forward" speed control method described above, the present invention controls the gage roll/auxilliary roll speed ratio by monitoring the tension present in the dough sheet between these rolls. Inspection of FIG. 4 shows that the dough sheet comes off the auxilliary rolls in an arc, or loop, to conveyor 42. Clearly, if the flow rate through the gage rolls falls off due to an increase in dough viscosity, dough will "pile up" at the inlet side of the gage rolls, tension in the dough sheet will also decrease, and the loop will sag. Conversely, if flow increases through the gage rolls, dough sheet tension will increase, and the loop will tighten. Loop position sensor 39 is located to sense the position of the apex of the loop, and the gage roll speed is trimmed based on signals from it. For maximum accuracy, the loop sensor is employed in conjuction with auxilliary and gage roll inlet position sensors 35 and 45, respectively, located to detect "pile up" of dough at the upstream sides of those rolls. The computer can analyze the signals from these sensors to insure, for example, that a change in loop position is not caused by a change in flow conditions at the auxilliary rolls, rather than a change at the gage rolls.

Figure 7:
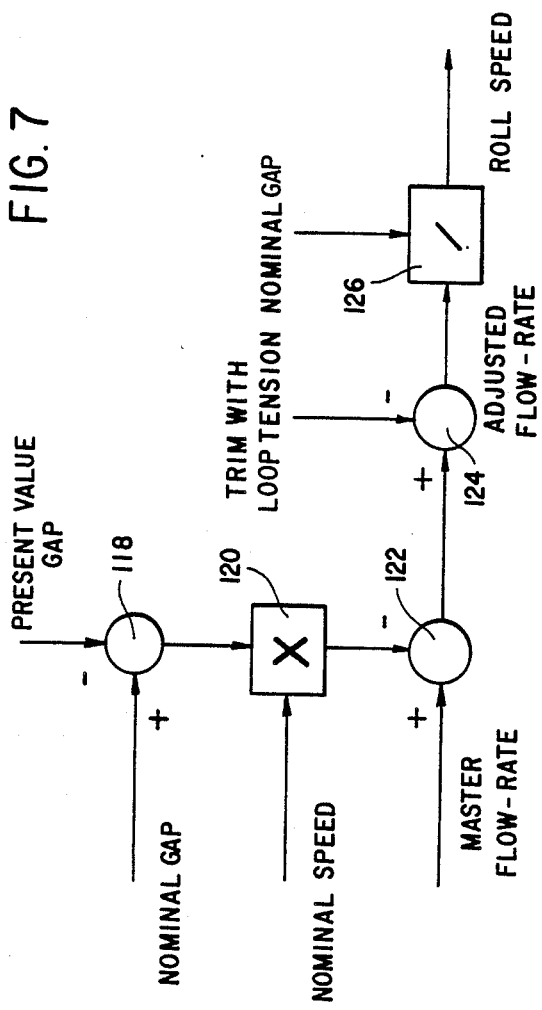
FIG. 7 is a control diagram showing roller speed control according to the present invention.

The roll speed compensation is shown schematically in FIG. 7. An actual flow rate is determined as the product of gap area and nominal speed in block 120. Adjustment of the gap, it will be noted, plays no part in the automated control system of the present invention. Rather, gap size is adjusted purely for product-related purposes by the operator. The actual gap is obtained by comparing the nominal gap with a sensed value in block 118. Actual flow rate is compared to the master flow rate (block 122) and any adjustment signal is further manipulated by the trim value derived from the loop position sensor in block 124. The gap area is factored out in block 126, and the adjusted roll speed is passed to the gage rolls.

Figure 8:
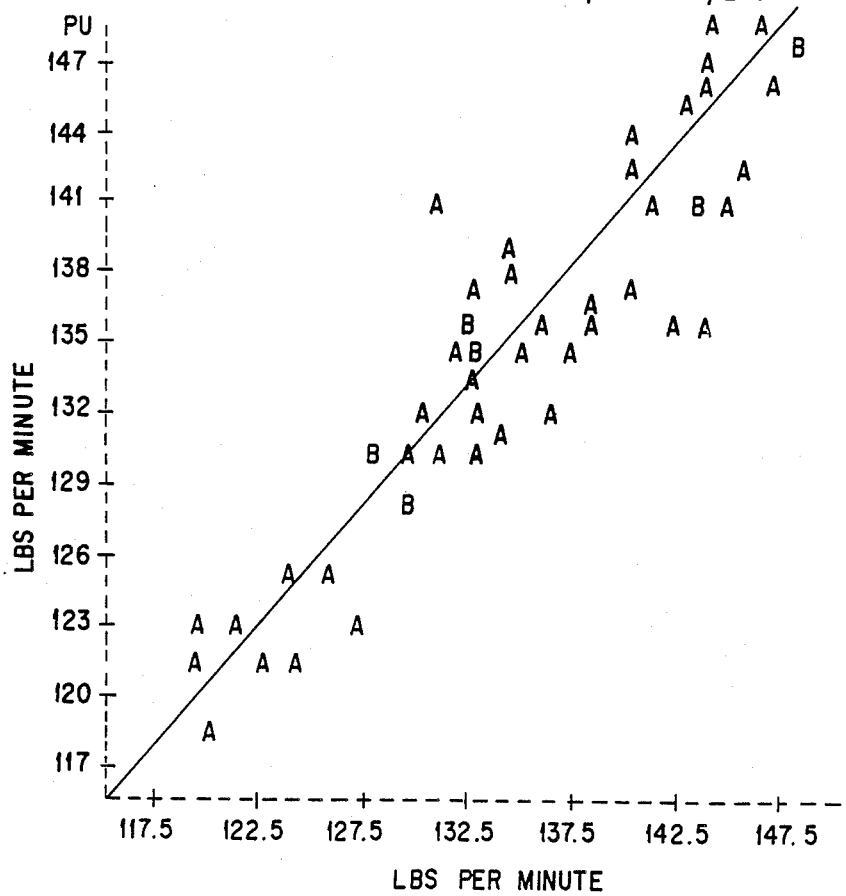
FIG. 8 is a chart showing the results of tests of a dought machining porocess according to the present invention.

The success of the present invention is apparent from a consideration of FIG. 8, which plots predicted dough throughput predicted by the method of the present invention on the y axis and actual observed thoughput on the x axis, both in pounds per minute. As can be seen, the data cluster nicely around the trend line, indicating a highly accurate control model. This result should be contrasted to that obtained using the power-demand control method, shown in FIG. 2, where data were widely scattered. Plainly, the present invention accomplishes the task of dough flow control.

Those in the art will understand that variations and modifications of the embodiment discussed herein can be made without departing from the spirit of the invention. For example, the number and arrangement of the rolls depends largely upon the product being produced, and the lamination step could be eliminated entirely. These and other changes may be made within the scope of the invention, which is defined solely by the claims appended hereto.

We claim:

1. In an apparatus for machining dough including a device for extruding a sheet of dough, at least one pair of opposed powered rollers arranged to receive and size the sheet of dough and an apparatus arranged downstream of the at least one pair of opposed powered rollers for separating the sheet of dough into products for baking, the improvement which comprises: a system controller including a plurality of sensing device coupled to preselected areas of the apparatus for machining dough to sense dough characteristics at each of the preselected areas and a plurality of control signal outputs, each of the outputs being coupled to a respective one of the device for extruding dough, the at least one pair of opposed powered rollers and the apparatus for separating the sheet of dough, and the controller further including a calculator operating to calculate control signals for selective output on the plurality of control signal outputs; the control signals all being calculated by the calculator as an integrated function of all of the sensed dough characteristics sensed by the plurality of sensing devices to provide an integrated control of the apparatus for machining dough for a constant mass dough flow throughout the apparatus.

2. The apparatus of claim 1, wherein a plurality of pairs of opposed powered rollers are arranged in series downstream from the device for extruding a sheet of dough and the calculator operating to initially calculate roller speed ratios required to maintain the constant mass dough flow throughout the apparatus and to continuously, dynamically calculate trims of individual roller speeds as a function of the sensed dough characteristics.

3. The apparatus of claim 2, wherein the plurality of pairs of opposed powered rollers includes a pair of gage rollers for a final sizing of the sheet of dough and the plurality of sensing devices includes a device for detecting changes in the tensile forces present in the sheet of dough at a location between the gage rollers and the immediately preceding pair of opposed powered rollers and a device to detect the thickness of the sheet of dough at a position immediately upstream from the apparatus for separating the sheet of dough.

4. The apparatus of claim 1, wherein the controller is a digital computer.

5. An apparatus for machining dough, which comprises:
a pair of opposed, powered rollers;
sensing means for sensing tensile forces present in a sheet of dough arranged to pass through said rollers, for sensing the thickness of said sheet of dough downstream from said rollers and for sensing the speed of rotation of said rollers; and
a calculator coupled to said sensing means and operating to a dynamically calculate a new speed of rotation for said rollers as an integrated function of said sensed tensile forces, said thickness and said sensed speed of rotation of said rollers;
said calculator being coupled to said opposed, powered rollers to control the roller in accordance with the dynamically calculated new speed of rotation.

* * * * *